June 4, 1968 D. THOMAIER ET AL 3,386,179
GYROCOMPASS
Filed March 11, 1965 2 Sheets-Sheet 1
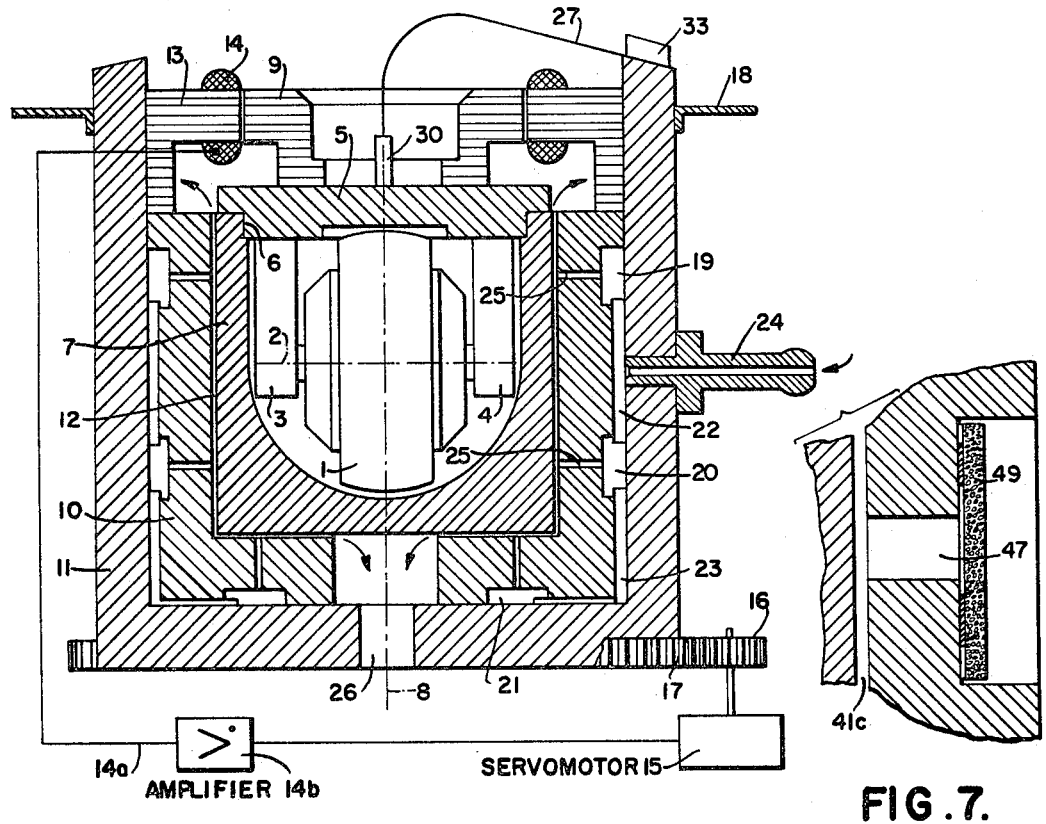
FIG.1.
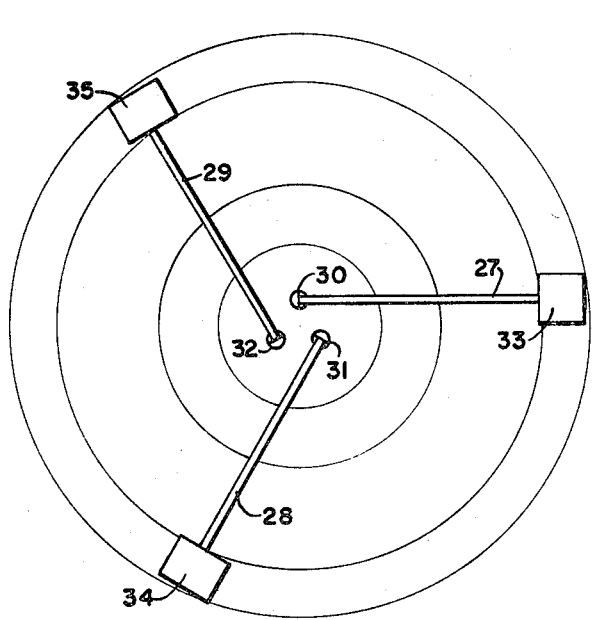
FIG.2
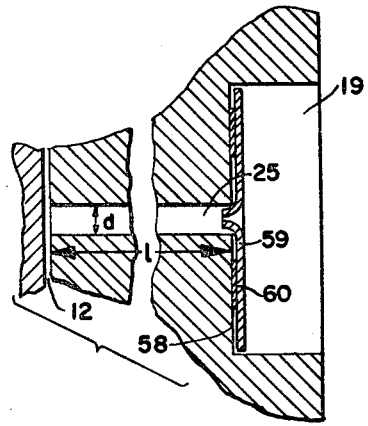
FIG.7.
FIG.6.
INVENTORS
Dieter Thomaier
Heinz Riethmüller
BY Spencer & Kaye
ATTORNEYS June 4, 1968    D. THOMAIER ET AL    3,386,179

GYROCOMPASS

Filed March 11, 1965    2 Sheets-Sheet 2

INVENTORS
Dieter Thomaier
Heinz Riethmüller

BY Spencer & Kaye

ATTORNEYS

United States Patent Office 3,386,179
Patented June 4, 1968

3,386,179
GYROCOMPASS
Dieter Thomaier, Heidelberg, and Heinz Riethmüller, Heidelberg-Kirchheim, Germany, assignors to TELDIX Luftfahrt-Ausrüstungs G.m.b.H., Heidelberg-Wiebling-en, Germany
Filed Mar. 11, 1965, Ser. No. 438,977
Claims priority, application Germany, Mar. 14, 1964, T 25,820
9 Claims. (Cl. 33—226)

ABSTRACT OF THE DISCLOSURE

A gyrocompass having a rotor element disposed in a first frame in the form of a cylinder, a second frame in the form of a cup-shaped housing in which the cylinder is disposed to define at least one gas cushion between the cylinder and the housing, means for rotating the housing so as to bring it into alignment with the cylinder, and mechanical spring means elastically interconnecting the rotor element and the housing, the spring means being conductive leaf springs which are connected for opposing rotation of the rotor element relative to the housing and for supplying electrical energy to the rotor element.

---

The present invention relates to a gyrocompass.

A conventional gyrocompass incorporates a one-degree-of-freedom gyro rotor in which a first frame or gimbal carrying the rotor is rotatable with respect to a second frame or gimbal, the first frame being rotationally elastically coupled to the second frame by means of a torque generator or so-called torquer. The second frame is rotatable with respect to the earth about a vertical axis and the first frame rotates within the second frame about the same axis. The gyro rotor is so mounted in the first frame that the spin axis of the rotor is always at right angles to the axis of the frame, i.e., that the spin axis is always horizontal to the same extent that the frame axis is vertical. Suitable electric read-out or so-called pick-up means are provided which produce a signal that is a function of the angle between the two frames, and the value read-out is applied to the torquer in such a manner as to produce a torque which acts against an increase of the angle. In this way, the pick-up means and the torquer form a system which in effect spring-couples the two frames to each other. If no external forces act on the frames, they will assume a definite angular position with respect to each other.

Inasmuch as, due to the horizontal component of the earth's rotation, the rotor has the endency to align its spin axis with the north-south direction, the gyrocompass can be used to find the true or polar north by manually turning the second frame until in coincides with the first frame, i.e., until the second frame assumes the quiescent position dictated by the above-mentioned pick-up means and torquer.

Another type of conventional gyrocompass, which operates on essentially the same principle, additionally includes a followup system which consists of an amplifier and a servomotor that drives the second frame about its axis. So long as the two frames form an angle with each other, the servomotor will drive the second frame in such a direction as to reduce the angle. After the oscillations have decayed—which delays the time until the compass accurately indicates true north—the two frames will assume their rest positions. As in the case of the first-described gyrocompass, the direction of the spin axis of the rotor is indicated by means of the second frame, or is otherwise suitably utilized as a true-north reference.

The accuracy of either of the above-described gyrocompasses is adversely affected as the result of any number of interfering torques. Of particular significance are the frictional moment of the bearing of the first frame in the second frame, i.e., the vertical bearing, and the moment resulting from the current lead-in means. The current lead-in means serve to supply electric energy from an external power source to the motor which drives the rotor, with special provision being made to feed the current from the second frame to the first frame. These current lead-in means are conventionally constituted by capacitative, inductive or electrolytic means, or simply by thin flexible leads. If the lead-in means are capacitative, inductive or electrolytic, this of necessity restricts their use to relatively large gyrocompasses and can, therefore, not be used for small gyrocompasses. Flexible leads, on the other hand, have to be limitel to very small cross sections so as not to produce any spurious torques, but such thin leads have been found to be impractical in operation because ther repeated deformation causes them to break.

It is, therefore, the primary object of the present invention to provide a gyrocompass, with a gyro rotor having one-degree-of-freedom (that is, a degree of freedom in addition to rotation about the spin axis), which gyrocompass overcomes the above-described drawbacks.

It is another object of the present invention to provide an improved gyrocompass which is of simple and yet rugged construction, and which accurately indicates the north-south direction.

It is a further object of the present invention to provide a gyrocompass which has a very low so-called "warm-up" time so that it indicates the north-south direction shortly after being put into operation.

With the above objects in view, the present invention resides, basically, in a one-degree-of-freedom gyrocompass in which the first frame, i.e., the frame which supports the gyro rotor and its electric drive motor, is in the form of a cylinder and the second frame is in the form of a cup-shaped housing, the cylinder being mounted in the cup-shaped housing for rotation about the vertical axis, and there being air-cushioning between the cylinder and housing. Furthermore, mechanical spring elements are provided which provide an elastic coupling acting against the rotation of the two frames relative to each other about the vertical axis, and these mechanical spring elements further serve as the current lead-in means by which electrical energy is supplied to the gyro rotor drive motor from an external power source. In practice, the spring means may also constitute the electrical connection between a pick-up component that is movable with the first frame and the remainder of a follow-up system, the latter being interposed between the two frames and responsive to the angle formed between them for applying to the second frame a force proportional to the angle between the frames for aligning the second frame with the north-south direction.

Additional objects and advantages of the present invention will become apparent upon consideration of the following description when taken in conjunction with the accompanying drawings in which:

FIGURE 1 is a longitudinal sectional view of one embodiment of a gyrocompass according to the present invention, the electronic amplifier and the servo motor being shown schematically.

FIGURE 2 is a simplified plan view of the gyrocompass of FIGURE 1 and shows the spring system.

FIGURE 6 is a sectional view showing one embodiment of the gas supplying conduits, the same being provided with a restriction constituted by perforated aluminum plate means.

FIGURE 7 is a sectional view showing another embodiment of the gas supplying conduits, the same being provided with a throttling restriction constituted by a porous layer.

Figure 3:
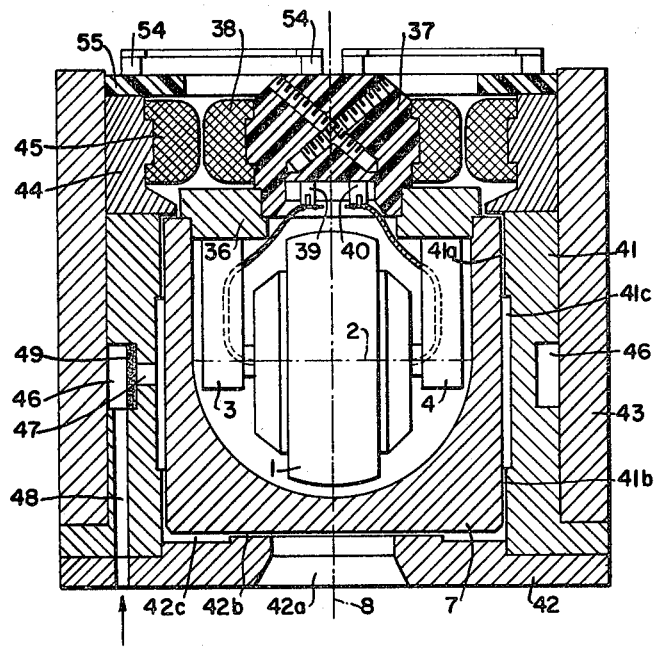
FIGURE 3 is a longitudinal sectional view of another embodiment of a gyrocompass according to the present invention, the same being provided with a modified spring system and with but one ring of gas supplying channels.

Referring now to the drawings and first to FIGURE 1 thereof, the same shows one embodiment of a gyrocompass according to the present invention, this gyrocompass comprising the north-seeking rotor element, incorporating the first frame wihch carries the gyro rotor and its electric drive motor, and the gyrocompass casing constituted by the second frame. The rotor 1, whose spin axis is shown at 2, is rotatably supported in two bearing blocks 3 and 4 which are secured to a round cover 5, the same being provided with a shoulder 6 so that the cover as a whole is centered, with a close tolerance, in a hollow cylinder 7, which can thus be considered as the first "frame" of the gyrocompass. The interior of the cylinder 7 is sufficiently large to accommodate the rotor 1 together with its bearing blocks 3 and 4. The cylinder 7, whose axis is shown at 8, has a very precisely machined cylindrical outer surface and outer bottom surface. The axis 8 is maintained precisely vertical by suitably mounting or suspending the housing. The rotor element further includes a rotor 9 which is mounted on the cover 5 and which forms part of an inductive pick-up means.

The casing part of the gyrocompass comprises a cup-shaped housing 10 and an outer vessel 11, the same being telescoped one within the other in an air-tight manner. The inner surfaces of the housing 10 are likewise precisely machined surfaces such that a very thin gap 12 is formed between the outer surfaces of the cylinder 7 and the inner surfaces of the housing 10. The vessel 11 carries an outer ring 13 which is provided with windings 14, this ring 13 being the stator of the inductive pick-up and coacting with the rotor 9. The windings 14 of the pick-up are connected, via a line 14a, to an amplifier 14b whose output, in turn, controls a servomotor 15. The latter has an output shaft carrying transmission in the form of a pinion 16 which meshes with a gear ring 17 carried by the vessel 11. The rotational speed of the servomotor, disregarding its response threshold, is approximately proportional to the deflection of the rotor element, as determined by the pick-up. For this purpose, the vessel 11 is also mounted so as to be rotatable about the axis 8. The north direction is indicated by means of a compass rose 18 which is secured to the vessel 11.

The gas cushion which supports the parts is produced as follows. The housing 10 is provided, at its outer surfaces, with cylindrical recesses which communicate with each other via grooves. Thus, when the housing 10 is placed into vessel 11, there will be formed gas chambers 19, 20, 21, which are placed in communication with each other by means of channels 22 and 23. In practice, the cylindrical recesses will be arranged along rings, there being, for example, twelve identical chambers 19 and twelve identical chambers 20, the same being arranged along two axially spaced apart rings. The chambers 19 and chambers 20 are distributed evenly about the periphery of the housing 10. Similarly, the chambers 21—which may also number twelve—provided at the undersurface of the housing 10 are arranged to form a ring. Gas is supplied to the chambers and channels via a nipple 24 which passes through the vessel 11, the nipple 24 being in communication with a suitable source of the gas under pressure. This gas then passes from the chambers 19, 20, 21 into the gap 12 via respective conduits 25. In order almost completely to reduce the pressure of the gas as it passes from the chambers into the conduits, suitable restricted or throttle portions are provided; these throttle portions are not shown in FIGURE 1 but will be described in conjunction with FIGURES 6 and 7. The gas in the cylindrical portion of gap 12, i.e., the portion formed between the cylindrical surfaces of the housing 10 and the cylinder 7, can escape upwardly while the gas in the flat disc-shaped portion of the gap can escape by flowing radially inwardly and thence through a bore 26 which extends through housing 10 and the vessel 11. The direction of flow of the gas is shown by the arrows.

FIGURE 2 shows the elastic connection between the rotor element and the gyrocompass casing, this connection being constituted by three leaf springs 27, 28, 29. One end of each leaf spring is connected to the cover 5 of the rotor element, near the center thereof, by means of insulating pins 30, 31, 32, thereby to obtain small lever arms. The other end of each leaf spring is connected to the outer vessel 11 of the casing by means of insulating clamps 33, 34, 35. The three leaf springs can be used as lead-ins for supplying electric power to the drive motor for the rotor 1. In the interests of simplicity, the electrical connections from the pins 30, 31, 32 to the rotor motor are not shown.

FIGURE 1 shows only the leaf spring 27, in side elevation. The leaf springs extend in three respective planes which are parallel to the axis of the cylinder and which are displaced 120° from each other. As is best seen from FIGURE 1, each spring extends axially from the point at which it is connected to the rotor element, for a certain distance, and is then bent about a gentle curve outwardly to the vessel 11, without any abrupt bends or twists. It will thus be appreciated that when the rotor element is deflected by a small angle with respect to the casing—which is all that the element will, in practice, be deflected—the leaf springs will, for all practical purposes, be subjected solely to bending and not to any torsion, i.e., the springs will only be bent but not twisted. Consequently, the design and assembly of the springs becomes very simple indeed, with another significant advantage being that the springs require practically no additional space. See in particular FIGURE 1 which shows how readily the pick-up can be accommodated below the arched leaf springs.

The vertical bearing can be modified in various ways. For example, the entire compass can be arranged within a cage which is cardanically mounted at a point above its center of gravity, so that no adjustment is necessary to allow for changes in the position of the compass. If the indicated north direction is to be used as a control value, and/or for repeater compasses, a further pick-up can be provided between the housing and the support (not shown) on which the housing is arranged. Such support can be an earth-bound base or a base erected on the ground, which base may also serve to support the servomotor 15.

The gyrocompass operates as follows: first, the compass must be so oriented that the axis 8 is vertical. If, as the compass is put in operation, the spin axis is not aligned with the earth's axis of rotation, the horizontal component of the earth's rotation acts on the rotor and causes precession. The cylinder 7 thus seeks to turn north, on its gas cushion. The elastic coupling between the rotor element and the casing yields so that the cylinder 7 is deflected, i.e., rotated about the vertical axis, with respect to the casing. This deflection is sensed by the pick-up 9, 13, 14. This is, basically, the principle of the gyrocompass. The servomotor 15 then turns the casing in such a direction as to decrease the amplitude of the deflection, with the servomotor 15 coming to rest as soon as the deflection becomes equal to zero. The geographic north can then be read off the compass rose 18.

Figure 4:
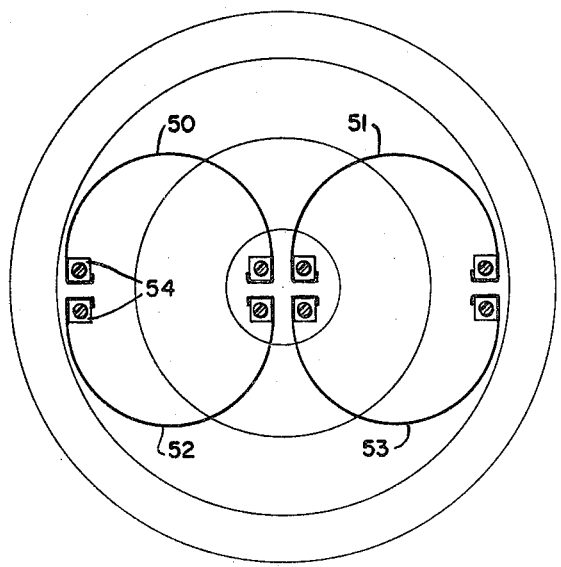
FIGURE 4 is a plan view of the gyrocompass of FIGURE 3 and shows the modified spring system.

The gyrocompass shown in FIGURES 3 and 4 differs from that of FIGURES 1 and 2 mainly insofar as the gas cushion bearing and the elastic connection between the rotor element and the casing are concerned. Also, the pick-up is of the coreless type and consists only of an inner and an outer winding. For the sake of simplicity, the amplifier and the servomotor drive arrangement are not shown.

Referring now to FIGURE 3 in particular, the same once again shows the rotor element comprising the rotor 1, the spin axis 2, the bearing blocks 3, 4, and the hollow cylinder 7, as well as the vertical axis 8, these parts being similar to those described above in connection with the embodiment illustrated in FIGURES 1 and 2. In the instant embodiment, the bearing blocks 3, 4 are attached to a modified cover 36 which overlies the cylinder 7. The cover 36 is provided with a central opening into which projects, from above, a body 37 made of insulating material, this body 37 carrying the inner winding 38 of the inductive pick-up. The body 37 is provided with four axially extending conductive pins whose upper ends are provided with threaded bores and whose lower ends are provided with eyes, as shown at 39 and 40, so that wires which supply electric power to the rotor drive motor can be soldered to the respective pins. The gyrocompass casing comprises a bearing cylinder 41, a bottom 42, and an outer sleeve 43, these three components being tightly connected to each other to form a cup-shaped housing. The outer sleeve 43 also has fit into it a carrier ring 44 which supports the outer winding 45 of the pick-up.

The principal difference of the gas cushion of the embodiment of FIGURES 3 and 4, with respect to the gas cushion of the embodiment in FIGURES 1 and 2, is that the gas cushion of the embodiment of FIGURES 3 and 4 does not extend over the entire surface of the cylinder. Instead, the inner surface of the cylinder 41 is provided with an annular recess which is located in the middle region of the cylinder and whose axial length is equal to about half the total axial length of the cylinder. The inner surface is thus constituted by two inwardly directed end regions 41a and 41b as well as the recessed region 41c. The bottom 42, which has a large gas outlet opening 42a in its center, is provided with an annular raised zone 42b and an outer recessed zone 42c. The gap between the cylinder 7 and the cup-shaped housing therefore has different width in different regions, with the gas cushioning providing bearing support only in the regions where the gap is narrow. Tests have shown that the bearing characteristics and rigidity of such a bearing are at least as good as those of a bearing in which the gap is of uniform width. At the same time, there are a number of advantages. For one thing, only the raised surface portions will have to be machined to within very small tolerances, so that the manufacturing costs of such a bearing are lower than those of a bearing in which the entire surfaces have to be accurately machined. Also, a single ring of inlet opening about the cylinder will suffice. Furthermore, the gas consumption will be substantially less. Gas is supplied via an annular channel 46, there being an odd number of conduits 47 leading from channel 46 to the gap, terminating, as shown, in the region of the gap portion 41c. Gas is supplied from the source of gas under pressure to the annular channel 46 via an axial channel 48. FIGURE 3 also shows a porous layer 49 through which the gas must pass as it flows from the annular channel 46 into the respective radial channels 47. The purpose of the porous layer is to reduce the pressure of the gas as it comes from the outside source.

The spring connection between the rotor element and the gyrocompass casing is, in the embodiment of FIGURES 3 and 4, constituted by four semicircularly arched leaf springs 50, 51, 52, 53, these springs lying in a plane that is at right angles to the axis 8. As is best shown in FIGURE 4, the springs together are arranged to describe a "figure eight." The ends of the springs are welded to square end pieces 54 by means of which they are connected to the insulating body 37 by being secured to the conductive leads which are arranged symmetrically about the axis 8. The other ends of the leaf springs are secured to a mounting ring 55 which itself is made of insulating material and is suitably secured to the gyrocompass casing above the pick-up. In practice, the ring 55 may be secured to the gyrocompass casing by means of ball-type detents, thereby to facilitate disassembly.

Figure 5:
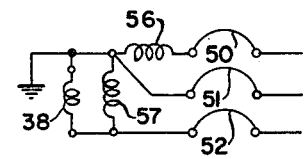
FIGURE 5 is a circuit diagram showing the electrical connection of the springs.

FIGURE 5 shows how three of the leaf springs are electrically connected, the fourth spring not being used for establishing any electrical connection. The rotor motor which, conventionally, is a two-phase hysteresis motor, has two windings 56 and 57. Two oppositely-phased voltages are applied across the windings 56 and 57, respectively. The juncture of the two windings, which is at ground potential, and the two ends of the windings are connected to the springs 50, 51, 52, as illustrated in FIGURE 5. The inner winding 38 of the pick-up is connected in parallel with the winding 57 and is therefore likewise energized via the leaf springs.

The above arrangement allows the springs to be selected without regard to anything other than practical considerations, i.e., the springs can, for example, be made heavy enough so that they will be able to withstand any shocks to which the gyrocompass might be subjected during movement, so that they will not be deformed as the result of current flowing therethrough, and so that the noise of the electronic amplifier will not interfere with the operation of the gyrocompass. Also, the springs can be so selected that the aperiodic amplification, which is dependent on the directional constant of the springs, will not be too high, because the amplifier will have to have a sufficiently long linear characteristic in order to allow aperiodic starting transients, and because less tolerance remains for increasing the amplification above the aperiodic value. Theoretical studies have also shown that even if there is a so-called turbine movement, i.e., a torque about the vertical axis exerted on the rotor element by the gas cushions, and even if there is an unbalance with respect to the vertical axis (the so-called "door-hinge" effect), no optimum conditions for the directional constant can be obtained.

FIGURE 6 shows, on an enlarged scale, one of the gas chambers of the gyrocompass of FIGURE 1, e.g., chamber 19, together with the respective gas supply conduit 25 which opens into gap 12. The conduit 25 is provided, at its inlet end, with a restriction or throttle opening. This restriction is constituted by a small plate 59, made for example of aluminum foil, which is glued to the flat bottom surface 58 of the chamber 19 and which is provided with a nozzle-like opening. An excellent seal is obtained if the glue 60 is an annulus about the mouth of the conduit 25. The opening in the plate 59 is easily formed by placing the tip of a punch against the plate at the point where the opening is to be formed, and then to strike the punch inwardly. In this way, the edges of the opening will project inwardly, thereby to form the throttle opening. This, experience has shown, is a very simple way in which to form the pressure reducing restriction.

As explained above, the purpose of the throttle opening is to reduce the pressure of the gas under which the gas is fed to the gap, as per se is known in the case of static gas cushion-type bearings. In this way, the pressure in conduit 25 depends on the force with which the surface of the cylinder seeks to narrow the gap 12, in the region in which the conduit 25 communicates with the gap. As the gap 12 becomes narrower, the pressure on conduit 25 rises to reach, as its limit, the pressure under which the gas is being piped to the gyrocompass. In this way, a counterpressure is exerted on the cylinder surface which once again increases the width of the gap, whereupon the pressure on conduit 25 drops, and so on.

It has been found that the above-described operation takes place best when the gas flowing from the conduit 25 into the gap 12 enters the gap free of any eddy currents. While the throttle restriction as such would tend to create eddy currents, the same will have died out by the time the gas reaches the gap, provided the conduit is sufficiently long. Accordingly, the ratio of the length $l$ of the conduit to its diameter $d$ should be at least 8:1.

FIGURE 7 shows another way in which the throttling restriction is formed, this modification being shown in conjunction with the gyrocompass of FIGURES 3 and 4. Here, the throttle opening is constituted by a large number of very fine openings, which act in the manner of a gas filter. This gas filter is constituted by a plate 49 which is glued to the bottom of the gas chamber and which is made of porous material. Experience has shown that this type of restriction, i.e., the porous mass type of gas filter, produces substantially less eddy currents than the throttle opening of the type described in conjunction with FIGURE 6. Consequently, the conduit 47 communicating with the gap 41c can be significantly shorter and larger, i.e., the ratio $l:d$ can be appreciably smaller than 8:1.

In practice, the porous mass can be any one of the mineral filter masses used for chemical and medicinal purposes, or a foam plastic material, or the like.

It will thus be seen that, in accordance with the present invention, there is provided a one-degree-of-freedom gyrocompass which comprises four basic components, namely, the rotor element, the gyrocompass casing, the mechanical spring means, and the follow-up system, wherein the rotor element incorporates a first "frame" in the form of a cylinder which supports the gyro rotor and drive motor therefor, and wherein the gyrocompass casing incorporates a second "frame" in the form of a cup-shaped housing within which the cylinder is mounted for rotation about the vertical axis. The cylinder and cup-shaped housing form one or more air gaps between themselves, and there are means for introducing gas into the gap or gaps for providing gas cushioning between the cylinder and cup-shaped housing. Furthermore, the mechanical spring means which elastically interconnect the rotor element and the gyrocompass casing are also a means for supplying electrical energy to the gyro rotor drive motor, and, if desired, for electrically connecting that part of the pick-up which is mounted on the rotor element with the remainder of the follow-up system.

While air cushions per se are known, the application thereof as a vertical bearing for a one-degree-of-freedom gyrocompass was not known prior to the present invention. Yet the use of such air cushion has been found to provide not only very low friction but also unexpectedly high rigidity of the vertical bearing insofar as its ability to maintain vertical orientation is concerned, and it is this characteristic which is decisive in a gyrocompass if the same is to have a short warm-up time and effective oscillatory damping. On the other hand, the very fact that the vertical bearing is virtually frictionless would render the gyrocompass particularly susceptible to spurious torques produced by the current lead-in means which supply electrical energy to the gyro rotor drive motor, and it is for this reason that it is important to provide a way in which current is fed into the rotor element without producing spurious torques. Hence, it is the combination of the gas cushion bearing and the fact that the spring means are used as the current lead-in means that enables a gyrocompass according to the present invention to achieve the objects described above.

The main reason why the use of the spring means as the current lead-in means does not produce any spurious torque is as follows. It is inherently not possible to provide any current lead-in means which produces zero torque. If, however, the current lead-in means are intentionally so arranged as to provide a directional torque, such combined spring means and current lead-in means can be used in place of the heretofore conventional torquer. That is to say, in accordance with the present invention, the current lead-in means also take over the function of elastically coupling the rotor element and the gyrocompass casing with each other. Consequently, the heretofore objectionable characteristics of the galvanic current lead-in means are now part of the directional constant of the spring means, and can therefore be precisely taken into consideration which, in turn, allows the accuracy of the compass to be increased.

Yet another advantage of the present invention will thus be seen to reside in the fact that, since the current lead-in means take over the function of elastically coupling the rotor element and gyrocompass casing, no separate torquer is needed. This reduces the construction costs. Furthermore, the springs themselves can readily be dimensioned sufficiently strong to avoid breakage during operation.

It will also be seen from the above that, thanks to the particular arrangement of the gas-supplying means for the cushion shown in the drawings (FIGURES 6 and 7), especially effective and eddy-free cushioning is obtained. With the arrangement of the gas conduits being as shown in FIGURES 3 and 4, there is the additional advantage that a single ring of gas supply conduits will suffice.

It will be understood that the above description of the present invention is susceptible to various modifications, changes, and adaptations, and the same are intended to be comprehended within the meaning and range of equivalents of the appended claims.

What is claimed is:

1. A one-degree-of-freedom gyrocompass, comprising, in combination:
   (a) a rotor element incorporating a first frame in the form of a cylinder, a rotor mounted in said cylinder for rotation about a spin axis, and an electric drive motor also arranged in said cylinder for driving said rotor about said spin axis;
   (b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing;
   (c) mechanical spring means composed of a plurality of leaf springs elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy, each of said leaf springs having one end connected to said rotor element at a point near said vertical axis, extending from there in a generally axial direction in a plane generally parallel to said vertical axis, and then being arched outwardly and having its other end connected to said gyrocompass casing; and
   (d) a follow-up system interposed between the rotor element and said gyrocompass casing and responsive to the angle formed between said element and said casing for applying to said casing a force, proportional to said angle between said element and said casing, for aligning said casing with the north-south direction.

2. A one-degree-of-freedom gyrocompass, comprising, in combination:
   (a) a rotor element incorporating a first frame in the form of a cylinder, a rotor mounted in said cylinder for rotation about a spin axis, and an electric drive motor also arranged in said cylinder for driving said rotor about said spin axis;
   (b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing;

(c) mechanical spring means composed of a plurality of leaf springs elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy, there being four leaf springs each being arched and having one end connected to said rotor element and the other end to said gyrocompass casing, said four leaf springs together describing a "figure eight" which lies in a plane forming a right angle with said vertical axis; and (d) a follow-up system interposed between the rotor element and said gyrocompass casing and responsive to the angle formed between said element and said casing for applying to said casing a force, proportional to said angle between said element and said casing, for aligning said casing with the north-south direction.

3. A one-degree-of-freedom gyrocompass, comprising, in combination:
(a) a rotor element incorporating a first frame in the form of a cylinder, a rotor mounted in said cylinder for rotation about a spin axis, and an electric drive motor also arranged in said cylinder for driving said rotor about said spin axis;
(b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing, said cup-shaped housing being provided with a plurality of gas conduits communicating with respective air gaps, there being at the input end of each conduit means forming a throttling restriction and composed of a plate overlying said input end and provided with a punched opening which leaves inwardly directed edges;
(c) mechanical spring means elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy; and
(d) a follow-up system interposed between the rotor element and said gyrocompass casing and responsive to the angle formed between said element and said casing for applying to said casing a force, proportional to said angle between said element and said casing, for aligning said casing with the north-south direction.

4. A one-degree-of-freedom gyrocompass, comprising, in combination:
(a) a rotor element incorporating a first frame in the form of a cylinder, a rotor mounted in said cylinder for rotation about a spin axis, and an electric drive motor also arranged in said cylinder for driving said rotor about said spin axis;
(b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing, said cup-shaped housing being provided with a plurality of gas conduits communicating with respective air gaps, there being at the input end of each conduit means forming a throttling restriction, said conduits having a length $l$ and diameter $d$ and the ratio $l:d$ at least 8:1;

(c) mechanical spring means elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy; and
(d) a follow-up system interposed between the rotor element and said gyrocompass casing and responsive to the angle formed between said element and said casing for applying to said casing a force, proportional to said angle between said element and said casing, for aligning said casing with the north-south direction.

5. A one-degree-of-freedom gyrocompass, comprising, in combination:
(a) rotor element incorporating a first frame in the form of a cylinder, a rotor mounted in said cylinder for rotation about a spin axis, and an electric drive motor also arranged in said cylinder for driving said rotor about said spin axis;
(b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing, said cup-shaped housing being provided with a plurality of gas conduits communicating with respective air gaps, there being at the input end of each conduit means forming a throttling restriction and composed of a porous mass;
(c) mechanical spring means elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy; and
(d) a follow-up system interposed between the rotor element and said gyrocompass casing and responsive to the angle formed between said element and said casing for applying to said casing a force, proportional to said angle between said element and said casing, for aligning said casing with the north-south direction.

6. A one-degree-of-freedom gyrocompass, comprising, in combination:
(a) a rotor element incorporating a first frame in the form of a cylinder, a rotor mounted in said cylinder for rotation about a spin axis, and an electric drive motor also arranged in said cylinder for driving said rotor about said spin axis;
(b) a gyrocompass casing incorporating a second frame in the form of a cup-shaped housing within which said cylinder is mounted for rotation about a vertical axis, said cylinder and said cup-shaped housing forming an air gap between themselves, and means for introducing gas into said gap for providing at least one gas cushion between said cylinder and said cup-shaped housing, between the outer cylindrical surface of said cylinder and the inner cylindrical surface of said cup-shaped housing, said air gap being sufficiently narrow to form an air cushion only in two axially spaced-apart regions, one of which is near the upper edge of said cylinder and housing and the other of which is near the bottom edge of said cylinder and housing, said air gap being wider throughout the remainder of the axial length of said cylinder and housing, there being but a single ring of conduits extending through said cup-shaped housing, said ring of conduits communicating with said wider portion of said air gap;
(c) mechanical spring means elastically interconnecting said rotor element and said gyrocompass casing for acting against rotation of said rotor element and gyrocompass casing relative to each other about said vertical axis, said spring means further being a means for supplying electrical energy to said drive motor from an external source of electrical energy; and (d) a follow-up system interposed between the rotor element and said gyrocompass casing and responsive to the angle formed between said element and said casing for applying to said casing a force, proportional to said angle between said element and said casing, for aligning said casing with the north-south direction.

7. A gyrocompass as defined in claim 1 wherein said follow-up system includes an electrical component secured to said rotor element and wherein said mechanical spring means are also a means constituting an electrical connection between said electrical component and the remainder of said follow-up system.

8. A gyrocompass as defined in claim 1 wherein said leaf springs are distributed uniformly about said vertical axis.

9. A gyrocompass as defined in claim 1 wherein said air gap is of substantially uniform thickness throughout.

References Cited

UNITED STATES PATENTS

| | | | |
|---|---|---|---|
| 2,606,447 | 8/1952 | Boltinghouse | 74—5 |
| 3,173,215 | 3/1965 | Johnston | 33—226 |
| 3,194,613 | 7/1965 | Pierry | 74—5 X |
| 3,231,984 | 2/1966 | Howe et al. | 74—5.4 |

FRED C. MATTERN, Jr., *Primary Examiner.*

J. D. PUFFER, *Assistant Examiner.*